United States Patent
Li et al.

(10) Patent No.: US 7,394,754 B2
(45) Date of Patent: Jul. 1, 2008

(54) SYSTEM AND METHOD FOR TRANSMITTING DATA IN A MULTIPLE-BRANCH TRANSMITTER-DIVERSITY ORTHOGONAL FREQUENCY-DIVISION MULTIPLEXING (OFDM) SYSTEM

(75) Inventors: Kuo Hui Li, Hsinchu (TW); Charles Huang, Hsinchu (TW); Mao-Ching Chiu, Hsinchu (TW); Hung-Kun Chen, Hsinchu (TW); Chao-Ming Chang, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 1100 days.

(21) Appl. No.: 10/301,046

(22) Filed: Nov. 21, 2002

(65) Prior Publication Data

US 2004/0022183 A1    Feb. 5, 2004

Related U.S. Application Data

(60) Provisional application No. 60/400,888, filed on Aug. 1, 2002.

(51) Int. Cl.
*H04J 11/00* (2006.01)
*H04L 27/00* (2006.01)
*H04B 1/04* (2006.01)

(52) U.S. Cl. ............... 370/210; 370/208; 370/310; 370/337; 370/370; 370/380; 375/296; 375/299; 375/346; 455/101; 455/104; 455/112

(58) Field of Classification Search ........ 370/208–310.2, 370/319, 337–343, 366, 370–374, 430, 380–385; 375/296, 299, 345; 455/101–104, 112
See application file for complete search history.

(56) References Cited

U.S. PATENT DOCUMENTS

| | | | |
|---|---|---|---|
| 5,815,488 A * | 9/1998 | Williams et al. ............ 370/206 |
| 5,914,933 A * | 6/1999 | Cimini et al. ............... 370/208 |
| 6,175,551 B1 * | 1/2001 | Awater et al. ............... 370/210 |
| 6,351,499 B1 * | 2/2002 | Paulraj et al. ............... 375/267 |
| 6,377,631 B1 * | 4/2002 | Raleigh ...................... 375/299 |
| 6,377,632 B1 * | 4/2002 | Paulraj et al. ............... 375/299 |
| 6,480,522 B1 * | 11/2002 | Hoole et al. ................. 375/130 |
| 6,671,524 B1 * | 12/2003 | Sudo .......................... 455/561 |
| 6,751,263 B1 * | 6/2004 | Nie ............................. 375/260 |
| 6,768,713 B1 * | 7/2004 | Siala et al. .................. 370/203 |
| 6,850,481 B2 * | 2/2005 | Wu et al. .................... 370/208 |
| 6,961,388 B2 * | 11/2005 | Ling et al. .................. 375/267 |
| 7,020,072 B1 * | 3/2006 | Li et al. ...................... 370/208 |
| 7,028,246 B2 * | 4/2006 | Kim et al. ................... 714/784 |
| 7,061,854 B2 * | 6/2006 | Tarokh et al. ............... 370/206 |
| 7,133,459 B2 * | 11/2006 | Onggosanusi et al. ...... 375/267 |
| 7,233,625 B2 * | 6/2007 | Ma et al. .................... 375/260 |
| 7,269,224 B2 * | 9/2007 | Stuber et al. ................ 375/260 |
| 2002/0034159 A1 * | 3/2002 | Greaves et al. ............. 370/208 |
| 2002/0181390 A1 * | 12/2002 | Mody et al. ................. 370/208 |
| 2002/0191535 A1 * | 12/2002 | Sugiyama et al. .......... 370/208 |
| 2003/0021297 A1 * | 1/2003 | Miyashita et al. .......... 370/503 |
| 2003/0026200 A1 * | 2/2003 | Fu et al. ..................... 370/208 |
| 2003/0152023 A1 * | 8/2003 | Hosur et al. ................ 370/208 |

* cited by examiner

*Primary Examiner*—Edan Orgad
*Assistant Examiner*—Venkatesh Haliyur
(74) *Attorney, Agent, or Firm*—Thomas, Kayden Horstemeyer & Risley

(57) ABSTRACT

A system and method for transmitting data in multiple-branch transmitter-diversity OFDM systems is presented. In one embodiment, an approach is taken where an inverse Fourier transform (IFT) is performed on data prior to encoding the data for transmission in the multiple-branch transmitter-diversity system. In another embodiment an IFT is performed on data prior to encoding the data using a space-time block code (STBC) algorithm.

10 Claims, 6 Drawing Sheets

SYSTEM AND METHOD FOR TRANSMITTING DATA IN A MULTIPLE-BRANCH TRANSMITTER-DIVERSITY ORTHOGONAL FREQUENCY-DIVISION MULTIPLEXING (OFDM) SYSTEM

CROSS REFERENCE TO RELATED APPLICATIONS

This application claims the benefit of U.S. provisional patent application serial No. 60/400,888, entitled "System implementation of space-time-block-coded OFDM," filed on Aug. 1, 2002, which is incorporated herein by reference in its entirety.

FIELD OF INVENTION

The present invention relates generally to data communications and, more particularly, to a system and method for transmitting data in a multiple-branch transmitter-diversity orthogonal frequency-division multiplexing (OFDM) system.

BACKGROUND

Wireless communication is characterized as transmitting signals between two locations without the use of a connection cable. In some instances, the two locations may be rather distant from each other. Wireless communication may provide a convenient option for communication between such distant locations.

Equipment for the wireless communication system has typically been rather expensive. However, recently, equipment costs have declined due to recent developments in semiconductor fabrication, wireless communication technology, and digital signal processing. Thus, applications related to wireless communications are increasing. For example, wireless local area networks (LAN) has recently emerged as a viable alternative to traditional wired-LAN.

In typical wireless communication systems, data or information is converted into a radiofrequency (RF) signal prior to transmission to a remote receiver. The remote receiver receives the RF signal and processes the received RF signal to recover the originally transmitted data or information. Many approaches have been proposed to assure proper transmission and recovery of the data or information. Systems and methods relating to space-time block code (STBC) are included among these approaches.

STBC has been proposed to provide transmit diversity gain to a receiver with a very simple maximum-likelihood decoding algorithm. FIG. 5 is a schematic illustration showing the operating principle of STBC. As shown in FIG. 5, an STBC coder 500 is associated with two transmission antennas 502, 504 to achieve transmitter diversity. Once signals have been transmitted from the two transmission antennas 502, 504, a receiving antenna 506 receives the substantially simultaneously transmitted signals. In FIG. 5, the signals, channel impulse responses, and noise are shown in the time domain, which are conventionally denoted by lower-case letters. An input complex-symbol stream of the STBC encoder 500 is grouped into pairs of signals, which are denoted as $x_1$ and $X_2$. Each symbol has a symbol period of T, with $x_1$ being the first symbol and $x_2$ being the second symbol that follows $x_1$. After receiving $x_1$ and $x_2$, the STBC encoder 500 performs a two-step calculation, with each calculation outputting one symbol at each of the two output ports of the STBC encoder 500. At the first step of the calculation, the STBC encoder 500 simply relays $x_1$ and $X_2$ to its first parallel output port 512 and second parallel output port 514, Then $x_1$ and $x_2$ are directed to individual RF transmitters (not shown) to be converted to RF signals for transmission by antennas 502, 504. At the second step of the calculation, $-x_2^*$ (which is the negative of the complex conjugate of $x_2$) and $x_1^*$ (which is the complex conjugate of $x_1$) are generated by the STBC encoder 500 at the first parallel output port 512 and second parallel output port 514, respectively. It is presumed, in the STBC model, that the gain $h_1$ of the channel between the first antenna 502 and the receiving antenna 506 is independent of the gain $h_2$ of the channel between the second antenna 504 and the receiving antenna 506. It is further presumed that both channels are static across two consecutive transmit symbols. In other words, it is presumed that the channel gain for the second symbol period is the same as the channel gain for the first symbol period. Thus, if $y_1$ and $y_2$ represent the received symbols at the first and second symbol periods, respectively, then $y_1$ and $y_2$ may be expressed as:

$$y_1 = h_1 \cdot x_1 + h_2 \cdot x_2 + z_1 \qquad [Eq.\ 1],$$

and:

$$y_2 h_1 \cdot (-x_2^*) + h_2 \cdot x_1^* + z_2 \qquad [Eq.\ 2],$$

where $z_1$ and $z_2$ are independent additive noise terms. If $\tilde{h}_1$ and $\tilde{h}_2$ are the estimated channel gains of $h_1$ and $h_2$, respectively, then approximations (within a multiplicative factor) of the two transmit signals $\hat{X}_1$ and $\hat{X}_2$ can be approximately recovered in terms of $\tilde{h}_1$ and $\tilde{h}_2$ as:

$$\hat{x}_1 = \tilde{h}_1^* \cdot y_1 + \tilde{h}_2 \cdot y_2^* \qquad [Eq.\ 3],$$

and:

$$\hat{x}_2 = \tilde{h}_2^* \cdot y_1 - \tilde{h}_1 \cdot y_2^* \qquad [Eq.\ 4].$$

Though the above STBC is described in space-time domain, it is clear to one of ordinary skill in the art that the STBC can also be applied to space-frequency domain. Since the principles underlying STBC are well known, further discussion of STBC principles is omitted.

STBC is optimally designed for systems that employ channels which are flat-fading and time-invariant over two consecutive symbol durations. Since time-invariant flat-fading channels have a negligible variation in channel gain, systems employing flat-fading channels may be modeled as constant-gain systems. Unfortunately, if STBC is employed in a wide-band system, the constant-gain system model is no longer accurate because the channel gain within the bandwidth may vary considerably. Hence, for wide-band systems, inter-symbol interference (ISI) mitigation techniques, such as frequency-selective channels, are typically used.

In systems employing frequency-selective channels, each channel may be viewed as having a constant gain due to the division of the wide frequency band into multiple narrower frequency channels. Thus, while inter-channel distortions may vary across the wide frequency band, intra-channel distortions within the narrower frequency channels may be presumed to be constant. Thus, the ISI may be independently determined for each channel.

In mitigating ISI problems, orthogonal frequency division multiplexing (OFDM) techniques have shown promise. OFDM techniques have only recently gained popularity, due in part to advances in signal processing and microelectronics. OFDM splits data streams into N parallel data streams of reduced data rate, and transmits each of the N parallel data streams on a separate sub-carrier. The sub-carriers are made orthogonal to each other by appropriately choosing the frequency spacing between the sub-carriers. Therefore, since the orthogonality of the OFDM sub-carriers typically ensures that the receiver can separate the OFDM sub-carriers, spectral overlapping among sub-carriers may be permitted.

OFDM operation block diagrams are shown in FIG. 6. Following convention, the signals, the channel impulse responses, and the noise in the frequency domain are denoted by capital letters while the signals, the channel impulse responses, and the noise in time domain are denoted by a lower-case letters. As shown in FIG. 6, the serial-to-parallel (S/P) converter 600 collects frequency-domain serial input signals X(k), where k={0, . . . , N−1}, and N is the number of OFDM sub-carriers. The collected frequency-domain serial input signals X(k) are converted into frequency-domain parallel signals. The frequency-domain parallel signals are then directed to an inverse discrete Fourier transform (IDFT) circuit 602. The IDFT circuit 602 transforms the frequency-domain parallel signals into time-domain parallel signals. The time-domain parallel signals from the IDFT circuit 602 are then converted into time-domain serial signals, x(n), where n={0, . . . , N−1}, by a parallel-to-serial (P/S) converter 604. Then, a cyclic-prefixed time-domain signal $x_{CP}(n)$ is generated in the CP unit 606 by adding a cyclic prefix (CP) with a guard period of G. The length of the CP is a value longer than the channel delay spreading. Thus:

$$x(n) = \frac{1}{\sqrt{N}} \sum_{k=0}^{N-1} X(k) e^{j\frac{2\pi k n}{N}}, n = 0, \ldots, N-1, \quad [Eq.\ 5]$$

and $$x_{CP}(n) = x((n+N-G) \bmod N) \quad [Eq.\ 6],$$

with CP being a part of the original packet. Since N+G signals are actually transmitted, the signal block becomes $x_{CP}(n)$, where n={0, . . . , N+G−1}. RF unit 608 converts the signal block $x_{CP}$ into the RF signal, which is then transmitted by antenna 610. Antenna 612 at the receiver side subsequently receives the signal. After being converted by the RF unit 614, the received signal $y_{CP}(n)$ becomes:

$$y_{CP}(n) = x_{CP}(n) \otimes h(n) + z(n), n=0, \ldots, N+G-1 \quad [Eq.\ 7]$$

where $\otimes$ denotes convolution operator, h(n) is the time domain channel impulse response of the channel from the antenna 610 to the antenna 612, and z(n) represents the noise. After removing cyclic prefix at the CP unit 616, the resulting signal y(n) becomes:

$$y(n) = y_{CP}((n+G) \bmod N), n=0, \ldots, N-1 \quad [Eq.\ 8]$$

Thereafter, y(n) is directed through a S/P converter 618. The resulting signals are fed into a discrete Fourier transform (DFT) circuit 220, which transforms time-domain signals into frequency domain signals. The resulting output Y(k) of the DFT circuit 620, where k={0, . . . , N−1} is:

$$Y(k) = X(k) \cdot H(k) + Z(k) \quad [Eq.\ 9]$$

where H(k) and Z(k) are the N-dimensional DFT of h(n) and z(n), respectively. The parallel output of the DFT circuit 620 is then connected to a P/S converter 622, which generates serial signals.

Since the principles underlying OFDM technology is well known, further discussion of OFDM principles is omitted.

While STBC-OFDM technology has been proposed for wireless communication systems, the complexity and cost impediments of implementing STBC-OFDM to wireless communication systems is still relatively high.

In typical OFDM systems with two-branch transmitter diversity using STBC, a data block X is encoded by the STBC encoder into two parallel signal blocks $X_A$ and $X_B$, each having N data elements. $X_A$ and $X_B$ are then inverse Fourier transformed to produce time-domain signals $X_A$ and $X_B$, respectively. Cyclic prefixes are then added to each time-domain domain signal to produce cyclic-prefixed time-domain signals $X_{A,cp}$ and $X_{B,cp}$, respectively. Each of the cyclic-prefixed time-domain signals forms an OFDM block. The OFDM blocks are converted into RF signals and transmitted from their respective transmitter antennas simultaneously. Since two transmitter antennas are employed for the transmission of the signals, each of the signals is altered by channel characteristics $h_A$ and $h_B$ of their respective channels. As mentioned above, it is assumed that the channel characteristics are time-invariant during the period of an OFDM block. Thus, when a receiver antenna receives the aggregate signal from both of the transmitters, the received aggregate signal y(n) may be seen as:

$$y_{cp}(n) = (h_A(n) \otimes x_{A,cp}(n)) + h_B(n) \otimes x_{A,cp}(n)) + z(n) \quad [Eq.\ 10],$$

where n is the discrete time index, $\otimes$ represents a convolution function, and z(n) represents noise in the system. The received signal y(n) is produced upon removing the cyclic prefix of $y_{cp}p(n)$ according Eq. 6. The received signal may be represented in the frequency domain as:

$$Y(k) = (H_A(k) \cdot X_A(k)) + (H_B(k) \cdot X_B(k)) \degree Z(k),$$
$$k=0, \ldots, N-1 \quad [Eq.\ 11],$$

where Y(k), H(k) and Z(k) are the N-dimensional DFT of y(n), h(n) and z(n), respectively. Eq. 11 shows the received signal Y(k) as a superposition of the two transmitter signals and the noise.

Thus, for two-branch STBC OFDM systems, a first pair of signals $x_A = x_1$ and $x_B = x_2$ are generated, and, after appropriate processing, are transmitted from the first and second antennas, respectively. Upon receiving these signals, a receiver reconstructs the transmitted signals using well-known algorithms, such as maximum-likelihood estimation algorithms or minimum-mean-square algorithms. Since the reconstruction of STBC FDM signals are well known in the art, further discussion of signal reconstruction is omitted herein. In such STBC OFDM systems, digital data is encoded and transformed into analog RF signals suitable for transmission.

An example of a prior-art STBC OFDM system is shown in FIG. 1. As shown in FIG. 1, the system has a serial-to-parallel converter 110 that receives a frequency-domain serial data stream 105. The S/P converter 110 converts the frequency-domain serial data stream 105 into an N-dimensional frequency-domain parallel data block. The N-dimensional frequency-domain parallel data block is supplied to a frequency-domain STBC encoder 115 as $X_1$ and $X_2$ according to STBC convention. Upon receiving $X_1$ and $X_2$, the STBC encoder 115 generates two parallel frequency-domain digital signals $X_A$ 120 and $X_B$ 125 in a two-step process, such that $X_A = X_1$ and $X_B = X_2$ for the first process, and $X_A = -X_2^*$ and $X_B = X_1^*$ for the second process.

Upon generating the frequency-domain digital signals 120, 125 (or the appropriate complex conjugate signals), an IDFT is performed on the first frequency-domain digital signal $X_A$ 120 by an IDFT circuit 130. The IDFT of $X_A$ 120 produces a time-domain digital signal $x_A$. The time-domain digital signal $x_A$ is converted to a time-domain serial data stream 150 by a parallel-to-serial converter 140. Thereafter, a cyclic prefix is added to the time-domain serial data 150 at a CP adder 160 to produce a cyclic-prefixed time-domain data stream $x_{ACP}$ 170, which is relatively immune to ISI effects. This cyclic-prefixed time-domain data stream is converted to an analog RF signal for transmission by a radio frequency (RF) transmitter 180.

Similarly, the second digital signal $X_B$ 125 follows a similar path, and is cascaded through an IDFT circuit 135, a P/S converter 145, and a CP adder 165 to produce another cyclic-prefixed time-domain data stream $x_{BCP}$ 175. This cyclic-prefixed time-domain data stream is also converted to an analog signal for transmission by an RF transmitter 185. The two analog signals are transmitted substantially simultaneously from both RF transmitters 180, 185.

As shown in FIG. 1, since the frequency-domain STBC encoder 115 generates two frequency-domain digital signals $X_A$ 120 and $X_B$ 125 that are cascaded through two parallel paths, each hardware component in one path must have an analogous component in the other path. This duplication of hardware components results in added circuitry for each path, and, concomitantly, results in added computational complexity arising from the added circuitry.

The resulting complexity in computation and circuit give rise to a heretofore unaddressed need in the industry.

SUMMARY

The present invention is directed to systems and methods for transmitting data in multiple-branch transmitter-diversity OFDM systems.

Briefly described, in architecture, one embodiment of the system comprises an inverse Fourier transform (IFT) circuit adapted to perform an IFT on a data block to produce an inverse-Fourier-transformed data block, and a space-time block-code (STBC) encoder adapted to encode the inverse-Fourier-transformed data block for transmission in a multiple-branch transmitter-diversity OFDM system.

The present disclosure also provides methods for transmitting data in a multiple-branch transmitter-diversity OFDM systems. In this regard, one embodiment of the method comprises the steps of performing an inverse Fourier transform on a data block to produce an inverse-Fourier-transformed data block, and encoding the inverse-Fourier-transformed data block for transmission in a multiple-branch transmitter-diversity OFDM system.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
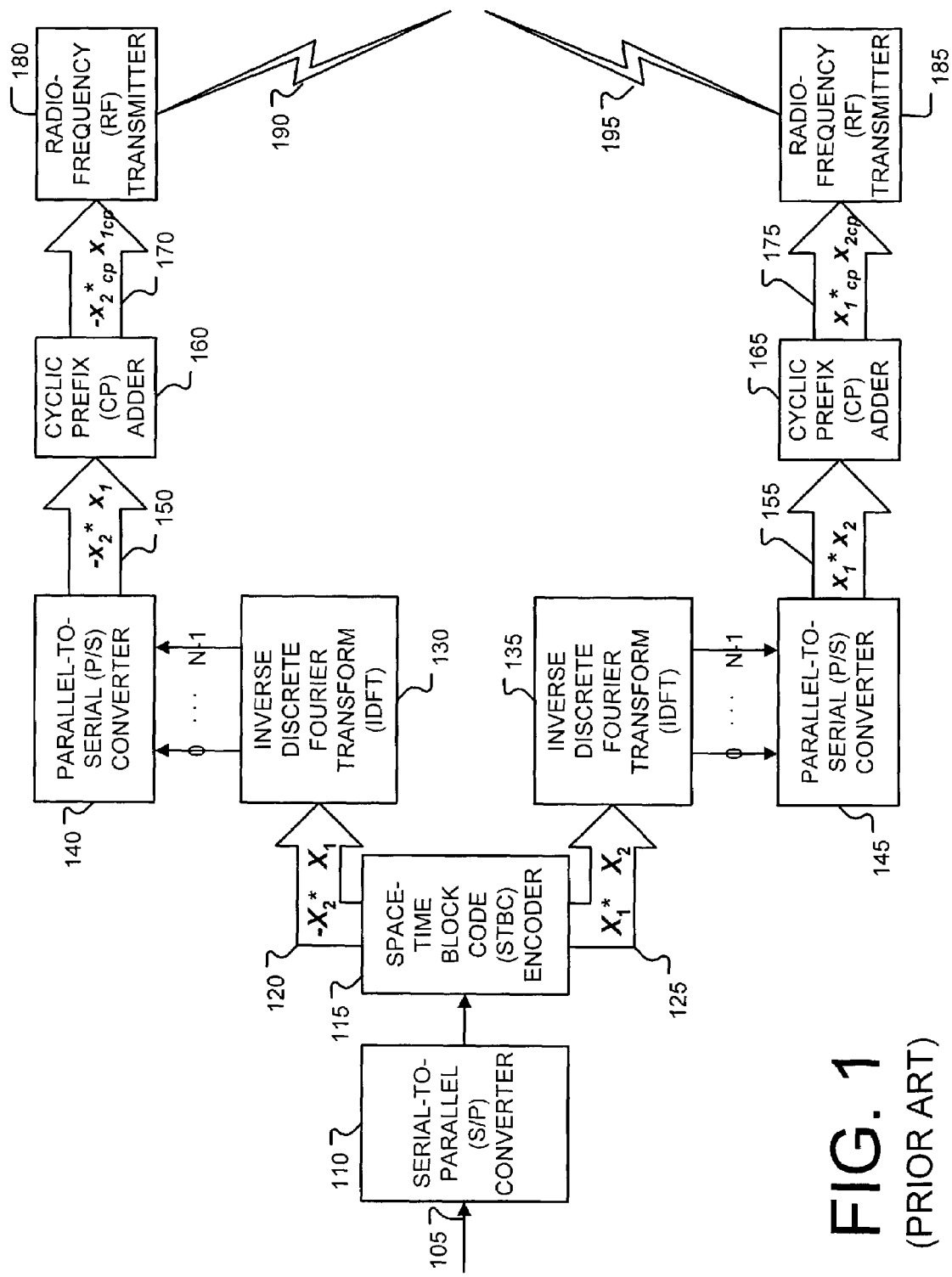
FIG. 1 is a block diagram of a prior art space-time block code (STBC) orthogonal frequency-division multiplexing (OFDM) system having many duplicative components for signal transmission.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

In a broad sense, systems and methods are presented in which a number of duplicative components are reduced in multiple-branch transmitter-diversity orthogonal frequency-division multiplexing (OFDM) systems. In one embodiment, inverse Fourier transform (IFT) calculations are performed on time-domain data, rather than on frequency-domain data, thereby eliminating multiple calculations of IFT. Since multiple-branch transmitter-diversity systems transmit conjugate pairs of signals, systems and methods are also presented in which a time-domain equivalent of frequency-domain conjugate pairs of signals is generated. Since the IFT is a symmetrical operation, an equivalent time-domain signal is transmitted by replacing the frequency-domain conjugate pairs of signals by time-domain circular-shifted signals. This is shown in greater detail with reference to FIGS. 2 through 4.

Figure 2:
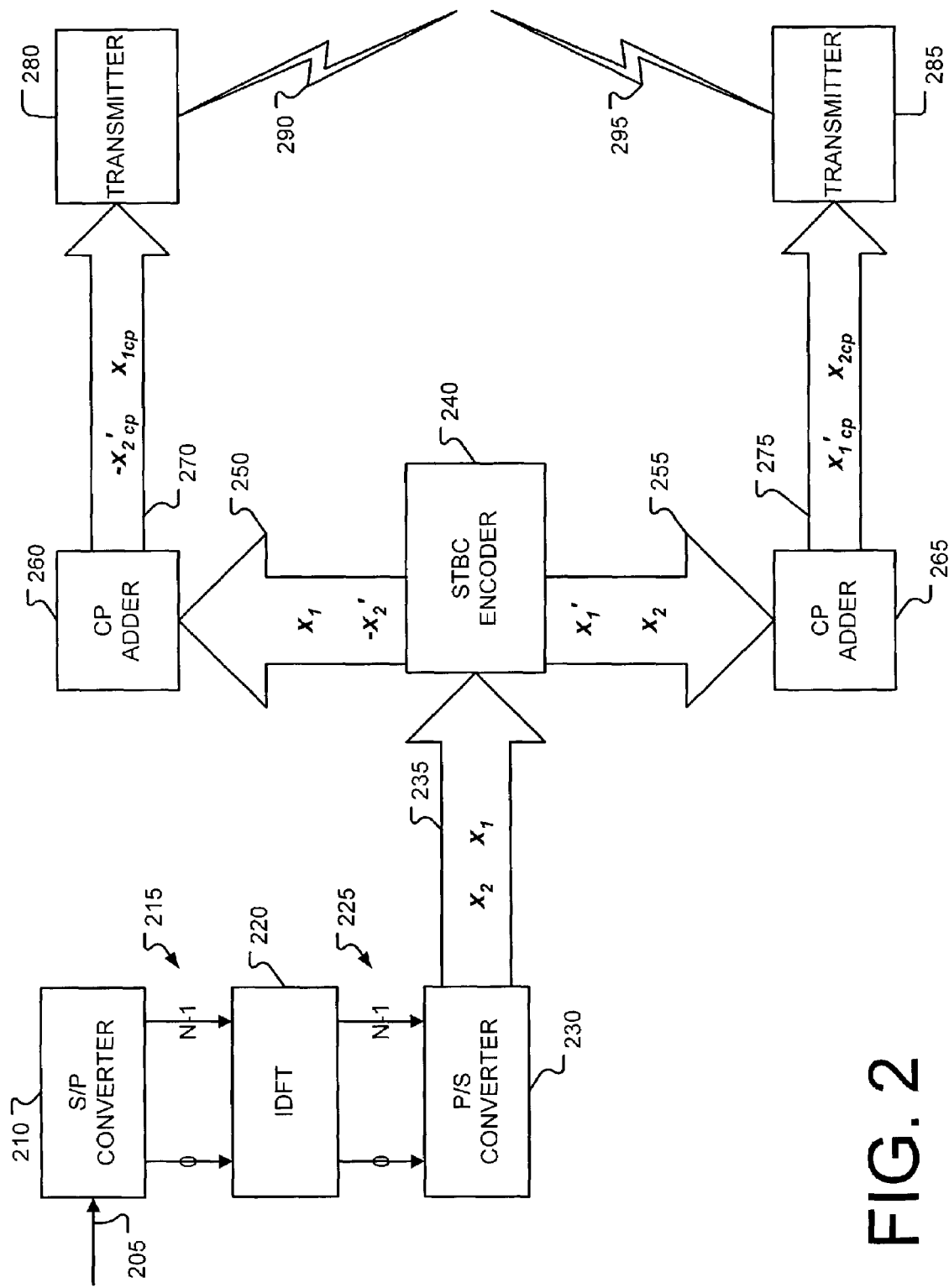
FIG. 2 is a block diagram showing one embodiment of a system having fewer duplicative components in the signal transmission path than the system of FIG. 1.

FIG. 2 is a block diagram showing one embodiment of a multi-branch transmitter-diversity OFDM system. As shown in FIG. 2, a frequency-domain serial digital input 205 of duration $T_d$ is received at a serial-to-parallel (S/P) converter 210. The S/P converter 210 converts the frequency-domain serial digital input 205 into an N-dimensional frequency-domain parallel data block 215, where N is the number of OFDM sub-carriers. The N-dimensional frequency-domain parallel data block 215 is then input to an inverse discrete Fourier transform (IDFT) circuit 220, which performs an IDFT on the N-dimensional frequency-domain parallel data block 215 to generate an N-dimensional time-domain parallel data block 225. The N-dimensional time-domain parallel data block 225 is input to a parallel-to-serial (P/S) converter 230, which converts the N-dimensional time-domain parallel data block 225 into a serial time-domain signal 235, each having N data elements, of duration T, where $T=N \cdot T_d$. The serial time-domain signals are arranged in pairs. As shown in FIG. 2, the first serial time-domain signal in each pair is denoted by $x_1$, and the second serial time-domain signal in each pair is denoted by $x_2$. The pair of serial time-domain signals 235 is input to a time-domain space-time block code (STBC) encoder 240, and the time-domain STBC encoder 240 converts the pair of serial time-domain signals 235 into two parallel pairs of signals at output ports 250, 255. In other words after receiving the pair of serial time-domain signals $x_1$ and $x_2$, the time-domain STBC encoder 240 performs a two-step calculation to generate two signals at a first output port 250 and a second output port 255. At the first step of the calculation, the time-domain STBC encoder 240 simply relays the pair of serial time-domain signals $x_1$ and $x_2$ to the first output port 250 and the second output port 255, respectively. At the second calculation step, the time-domain domain STBC encoder 240 generates circular-shifted signals, $-x_2'$ and $x_1'$, which are outputted at the first output port 250 and the second output port 255, respectively.

As one can see, the time-domain circular-shifted signals, $-x_2'$ and $x_1'$, are Fourier counterparts to the frequency-domain complex-conjugate signals, $-X_2^*$ and $X_1^*$ shown in the FIG. 1. Thus, the time-domain circular-shifted signals $-x_2'$ and $x_1'$ at the output of the multiple-branch transmitter-diversity OFDM system of FIG. 2 are ultimately identical to the output of the STBC OFDM system of FIG. 1. Once the signal, denoted by $x_A$, at the first output port 250 is produced, a cyclic prefix (CP) is added to the signal $x_A$ by a CP adder 260 to produce a first cyclic-prefixed data stream 270. Similarly a CP is added to the signal, denoted by $x_B$, at the second output port 255 by another CP adder 265 to produce a second cyclic-prefixed data stream 275. RF transmitters 280, 285 convert the cyclic-prefixed data streams to analog RF signals for transmission. The two analog RF signals are transmitted by both RF transmitters 280, 285 at substantially the same time.

Unlike the prior-art system of FIG. 1, which produced complex conjugate signals 120, 125 in the frequency domain, the embodiment of FIG. 2 produces circular-shifted signals 250, 255 in the time domain, thereby reducing the number of IDFT calculations. Thus, unlike prior art STBC OFDM systems that perform two IDFT operation, the embodiment of FIG. 2 performs only one IDFT operation on the N-dimensional frequency-domain parallel data block 215. By performing only one IDFT operation, the embodiment of FIG. 2 removes the need for many of the duplicative components that are found in the prior art system of FIG. 1.

It should be appreciated that the computational burden increases exponentially as the number of branches in a multiple-branch transmitter-diversity system increases. Thus, much of the computational burden may be reduced by performing the IDFT operation only once in systems having two, three, four, or more branches. In this regard, other embodiments of the invention may include multiple-branch transmitter-diversity OFDM systems having more than two transmission branches.

Figure 3:
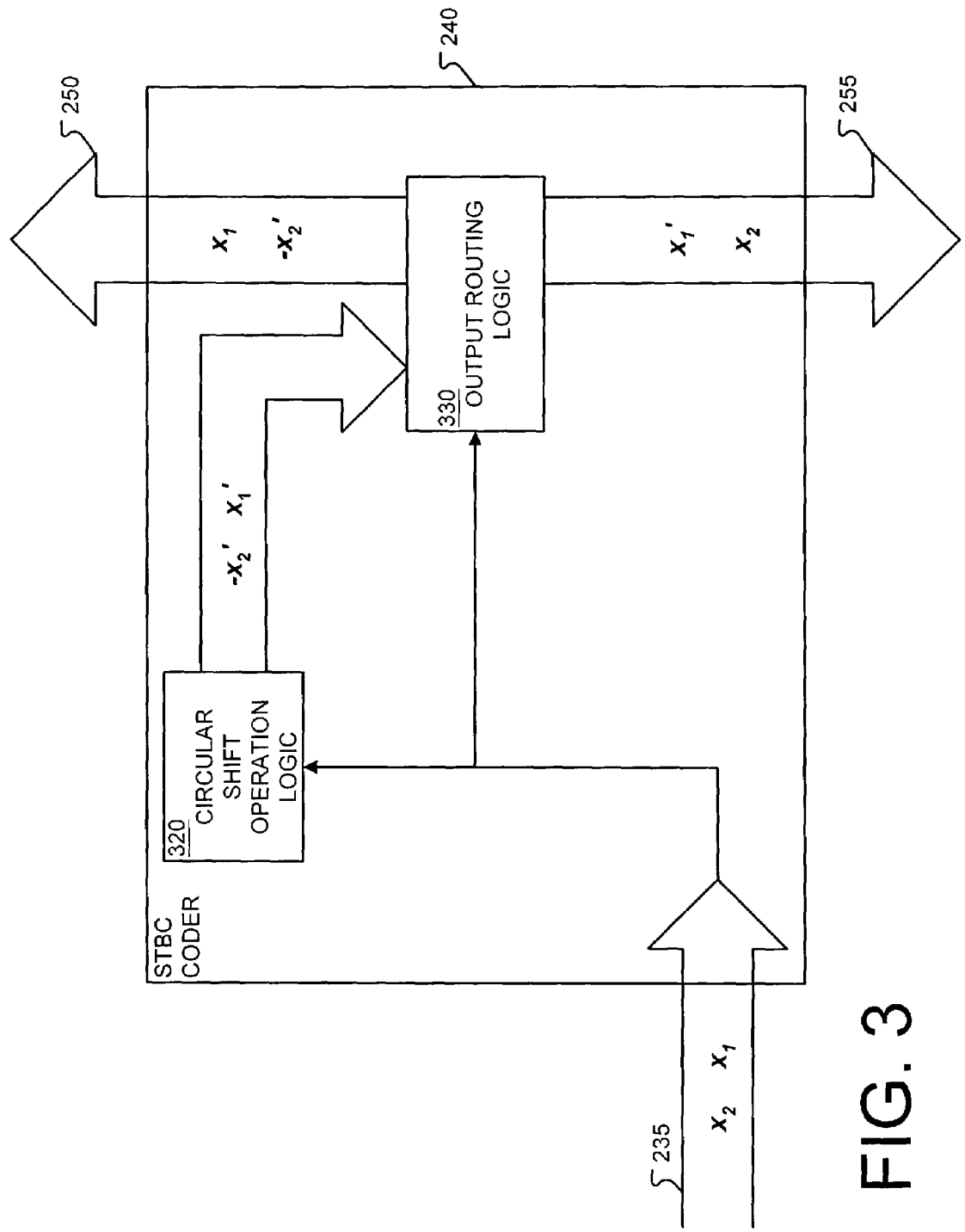
FIG. 3 is a block diagram showing the time-domain STBC encoder of FIG. 2 in greater detail.

FIG. 3 is a block diagram showing the time-domain STBC encoder 240 of FIG. 2 in greater detail. As described above with reference to FIG. 2, the time-domain STBC encoder 240 receives pairs of input signals $x_1$ and $x_2$ at its input port. In a more general sense, each consecutive pair of input signals $x_{2n-1}$ and $x_{2n}$, where n represents a data block index, are received at the input port of the time-domain STBC encoder 240. Upon receiving $x_{2n-1}$ and $x_{2n}$, the time-domain STBC encoder 240 performs a two-step calculation to generate two pairs of signals at each of the output ports 250, 255. At the first step of the calculation, the first pair of outputs of the time-domain STBC encoder 240 are $x_{2n-1}$ on the first output port 250 (hereinafter "output port A"), and $x_{2n}$ on second output port 255 (hereinafter "output port B"). At the second step of the calculation, the second pair of outputs of the time-domain STBC encoder 240 are $-x'_{2n}$ on output port A 250 and $x'_{2n-1}$ on output port B 255, where $-x'_{2n}$ and $x'_{2n-1}$ represent circular-shifted signals of $x_{2n}$ and $x_{2n-1}$, respectively. Thus, the time-domain STBC encoder 240 comprises circular-shift operation logic 320 and output-routing logic 330 to properly manipulate and organize the signals.

The circular-shift operation logic 320 receives $x_{2n-1}$ and $x_{2n}$, and generates circular-shifted signals $x'_{2n-1}$ and $-x'_{2n}$, respectively, from $x_{2n-1}$ and $x_{2n}$, such that:

$$x'_{2n-1}(n) = x_{2n-1}(N-1-n) \qquad [Eq. 12]$$

for n={0, ..., N−1} where n represents the index of the sub-element in $x'_{2n-1}$ or $-x'_{2n}$, and $$-x'_{2n}(n) = x_{2n}(N-1-n) \qquad [Eq. 13],$$

for n={0, ..., N−1}. Thus, the circular-shifted signals $x'_{2n-1}$ and $-x'_{2n}$ are directed to the output-routing logic 330. The output-routing logic 330 receives $x_{2n-1}$, $x_{2n}$, $x'_{2n-1}$, and $-x'_{2n}$, and outputs $x_{2n-1}$ at output port A 250 for each odd-indexed data block; outputs $x_{2n}$ at output port B 255 for each odd-indexed data block; outputs $-x'_{2n}$ at output port A 250 for each even-indexed data block; and outputs $x'_{2n-1}$ at output port B 255 for each even-indexed data block. In other words, rather than generating frequency-domain complex conjugates, the time-domain STBC encoder 240 generates time-domain circular-shifted signals.

As seen from the systems of FIGS. 2 and 3, by placing the IDFT circuit 220 before the STBC encoder 240, many of the duplicative components of FIG. 1 can be eliminated. While FIGS. 2 and 3 show a system for transmitting data in multiple-branch transmitter-diversity OFDM systems, another embodiment may be seen as a method for transmitting data in multiple-branch transmitter-diversity OFDM systems. One embodiment of such a method is shown in FIG. 4.

Figure 4:
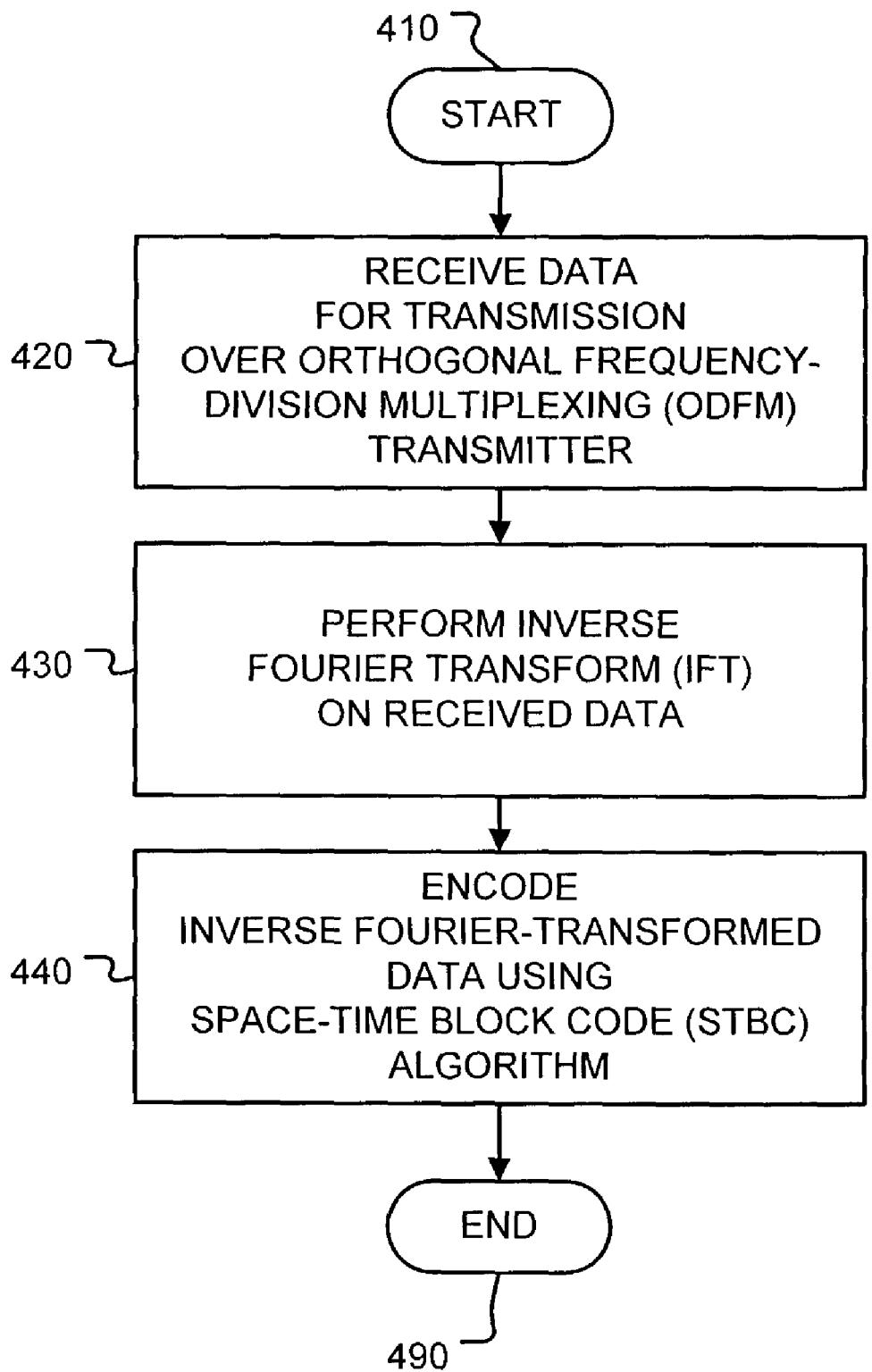
FIG. 4 is a flowchart showing one embodiment of a method for generating signals for transmission in a multiple-branch transmitter-diversity OFDM system.
Figure 5:
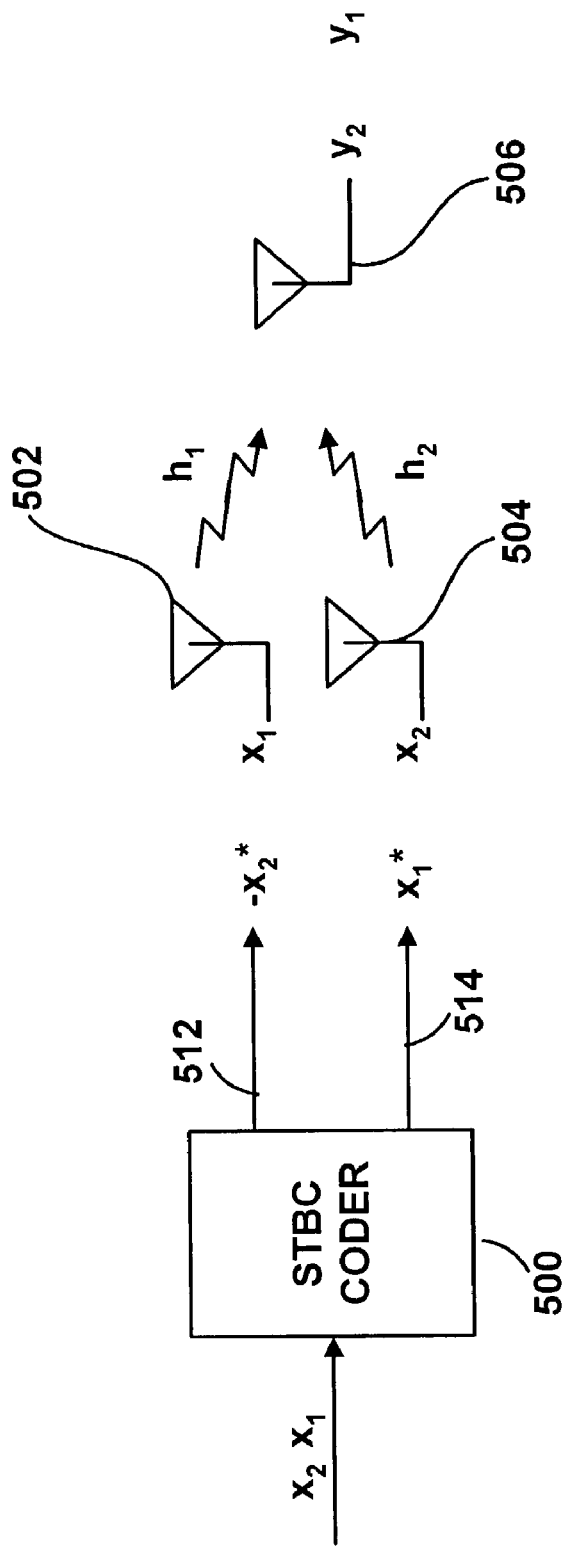
FIG. 5 is a block diagram showing a prior-art STBC system.
Figure 6:
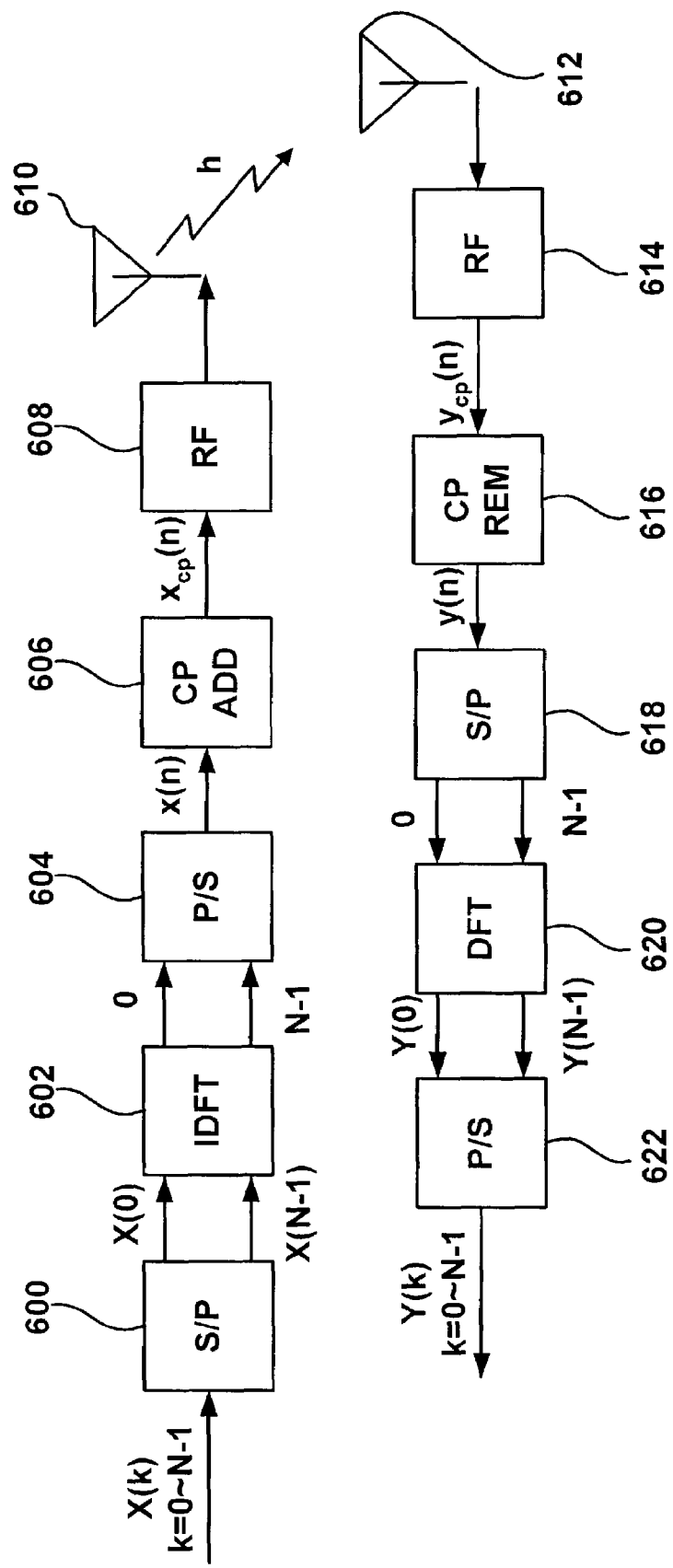
FIG. 6 is a block diagram showing a prior-art OFDM system.

FIG. 4 is a flowchart showing a method for generating STBC OFDM signals. As shown in FIG. 4, data for transmission in an STBC ODFM system is received (420) by an inverse Fourier transform (IFT) circuit. An IFT is performed (430) on the received data, thereby producing time-domain data from the received data. In one embodiment, the IFT may be an inverse discrete Fourier transform (IDFT) circuit 220 as shown in FIG. 2 or, more specifically, an inverse fast Fourier transform (IFFT) circuit (not shown). Once the IFT has been performed (430) on the data, the data is encoded (440) according to a space-time block-coding (STBC) algorithm. In other words, the time-domain data is encoded according to an STBC algorithm such that $x_{2n-1}$ is generated at a first output port for each odd-indexed data block; $x_{2n}$ is generated at a second output port for each odd-indexed data block; $-x'_{2n}$ is generated at the first output port for each even-indexed data block; and $x'_{2n-1}$ is generated at the second output port for each even-indexed data block. In other words, rather than generating frequency-domain complex conjugates, time-domain circular-shifted signals are generated according to the method as shown in FIG. 4.

As shown from the embodiment of FIG. 4, by performing an IFT on data prior to encoding the data for transmission in a multiple-branch transmitter-diversity OFDM system, complexities associated with performing multiple IFT operations is eliminated. In one embodiment, the method steps of FIG. 4 may be performed by a system as described in FIGS. 2 and 3. However, it will be clear to one of ordinary skill in the art that other systems may perform the method as outlined in FIG. 4, so long as the inverse Fourier transform is performed prior to the space-time block-coding.

The IDFT circuit 220, the STBC encoder 240, and the CP adders 260, 265 may be implemented in hardware, software, firmware, or a combination thereof. In the preferred embodiment(s), the IDFT circuit 220, the STBC encoder 240, and the CP adders 260, 265 are implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In an alternative embodiment, the IDFT circuit 220, the STBC encoder 240, and the CP adders 260, 265 are implemented in software or firmware that is stored in a memory and that is executed by a suitable instruction execution system.

Although exemplary embodiments have been shown and described, it will be clear to those of ordinary skill in the art that a number of changes, modifications, or alterations to the invention as described may be made. For example, while inverse discrete Fourier transforms are described in the embodiments of FIGS. 2 through 4, it will be clear to one of ordinary skill in the art that an inverse fast Fourier transform (IFFT) may be performed on the data if the number of data points is $2^M$. Additionally, if the number of data points is not $2^M$, then it will be clear to one of ordinary skill in the art that the data may be zero-filled or interpolated to $2^M$ data points to perform an IFFT on the data points. Furthermore, since the Fourier transforms (FT) and inverse Fourier transforms (IFT) are symmetrical operations, it will be clear to one of ordinary skill in the art that a scaled time-domain signal may be generated from the frequency-domain signal by simply performing a FT on the data, rather than performing an IFT. Moreover, one of ordinary skill in the art will recognize that the signals transmitted from channel A and channel B in FIG. 2 may be switched without adverse affect to the signal transmission, so long as the correct conjugate pairs are transmitted through their respective channels. Further, while a two-branch transmitter-diversity system is shown in FIGS. 2 through 4 for simplicity of illustration, it will be clear to one of ordinary skill in the art that the two-branch system may be readily extended to multiple-branch transmitter-diversity systems having additional branches. These changes, and other such modifications or alterations, should therefore be seen as within the scope of the disclosure.

What is claimed is:

1. A wireless communication device in an orthogonal frequency-division multiplexing system employing multiple-branch transmitter diversity, the transmitter comprising:
   a serial-to-parallel converter converting a serial digital input into a frequency-domain parallel data block;
   an inverse Fourier transform circuit performing an inverse Fourier transform on the frequency-domain parallel data block to produce a time-domain parallel data block;
   a parallel-to-serial converter converting the time-domain parallel data block into a serial time-domain signal;
   a space-time block-code encoder having a first output port and a second output port, the space-time block-code encoder converting the serial time domain signal to pairs of signals for transmission such that the signals are:
   X2n−1 at the first output port for each odd-indexed data block;
   X2n at the second output port for each odd-indexed data block;
   −X'2n at the first output port for each even-indexed data block; and
   X'2n−1 at the second output port for each even-indexed data block;
   a first cyclic prefix adder adding a cyclic prefix to the signal at the first output port to produce a first prefixed signal;
   a second cyclic prefix adder adding a cyclic prefix to the signal at the second output port to produce a second prefixed signal; a first digital-to-analog converter converting the first prefixed signal to a first analog signal; a second digital-to-analog converter converting the second prefixed signal to a second analog signal;
   a first transmitter transmitting the first analog signal; and
   a second transmitter transmitting the second analog signal at substantially the same time as the transmission of the first analog signal.

2. A wireless communication device comprising:
   an inverse Fourier transform (IFT) circuit performing an IFT on a data block to produce an inverse-Fourier-transformed data block, the inverse-Fourier-transformed data block having $X_{2n-1}$ data and $X_{2n}$ data; and
   "a space-time block-code (STBC) encoder converting the inverse-Fourier-transformed data block into pairs of signals for transmission through two channels
   hA and hB, such that the signals are:
   X2n−1 for the first signal to be transmitted on channel hA;
   X2n for the first signal to be transmitted on channel hB;
   −X'2n for the second signal to be transmitted on channel hA; and
   X'2n−1 for the second signal to be transmitted on channel hB."

3. The wireless communication device of claim 2, wherein the STBC encoder comprises circular-shift operation logic adapted to perform a circular shift operation, the circular-shift operation logic further generating $-X'_{2n}$ from $X_{2n}$, the circular-shift operation logic further generating $X'_{2n-1}$ from $X_{2n-1}$.

4. The wireless communication device of claim 2, further comprising a first cyclic-prefix adder generating a first cyclic prefix, the first cyclic prefix adder further concatenating the first cyclic prefix to $x_{2n-1}$.

5. The wireless communication device of claim 2, further comprising a first cyclic-prefix adder generating a first cyclic prefix, the first cyclic prefix adder further concatenating the first cyclic prefix to $-x'_{2n}$.

6. The wireless communication device of claim 2, further comprising a second cyclic-prefix adder generating a second cyclic prefix, the second cyclic prefix adder further concatenating the second cyclic prefix to $x_{2n}$.

7. The wireless communication device of claim 2, further comprising a second cyclic-prefix adder generating a second cyclic prefix, the second cyclic prefix adder further concatenating the second cyclic prefix to $x'_{2n-1}$.

8. The wireless communication device of claim 2, wherein the IFT circuit performs an inverse discrete Fourier transform (IDFT) on the data block to produce an inverse-discrete-Fourier-transformed data block.

9. The wireless communication device of claim 2, wherein the IFT circuit performs an inverse fast Fourier transform (IFFT) on the data block to produce an inverse-fast-Fourier-transformed data block.

10. The wireless communication device of claim 2, wherein the IFT circuit performs a Fourier transform on the data block to produce a Fourier-transformed data block.

* * * * *